United States Patent [19]
Hirayama

[11] Patent Number: 6,031,991
[45] Date of Patent: Feb. 29, 2000

[54] DEBUG SYSTEM AND METHOD FOR REPRODUCING AN ERROR OCCURRING IN PARALLEL-EXECUTED PROGRAMS

[75] Inventor: Hideaki Hirayama, Kawasaki-shi, Japan

[73] Assignee: Kabsuhiki Kaisha Toshiba, Kawasaki, Japan

[21] Appl. No.: 09/012,240

[22] Filed: Jan. 23, 1998

Related U.S. Application Data

[63] Continuation of application No. 08/443,463, May 18, 1995, abandoned.

[30] Foreign Application Priority Data

May 19, 1994 [JP] Japan .................................. 6-105545

[51] Int. Cl.[7] .................................................. G06F 9/44
[52] U.S. Cl. .................................. 395/704; 709/400
[58] Field of Search .................................... 395/704, 706; 714/34, 35, 37, 38; 709/400, 102, 104, 106, 107; 712/227, 228

[56] References Cited

U.S. PATENT DOCUMENTS

| | | | |
|---|---|---|---|
| 4,852,092 | 7/1989 | Makita | 371/12 |
| 4,912,707 | 3/1990 | Kogge et al. | |
| 5,124,989 | 6/1992 | Padawer et al. | 371/19 |
| 5,170,464 | 12/1992 | Hayes et al. | 395/76 |
| 5,321,698 | 6/1994 | Nguyen et al. | 371/12 |
| 5,410,685 | 4/1995 | Banda et al. | 395/183.14 |
| 5,428,618 | 6/1995 | Ueki et al. | 371/19 |

OTHER PUBLICATIONS

Bacon et al., "Hardware–Assisted Replay of Multiprocessor Programs", ACM, 1991, pp. 194–206.

Gaifman et al., "Replay, Recovery, Replication, and Snapshots of Nondetermininstic Concurrent Programs", ACM 1991, pp. 241–255.

Tolmach et al., Debuggable Concurrency Extensions for Standard ML, ACM 1991, pp. 120–131.

*Primary Examiner*—James P. Trammell
*Assistant Examiner*—Kakali Chaki
*Attorney, Agent, or Firm*—Finnegan, Henderson, Farabow, Garrett & Dunner, L.L.P.

[57] ABSTRACT

A debug system according to the invention is used in a multiprocessor system for executing a plurality of programs while taking check points. This debug system comprises detection section for detecting an error in any of the programs, restart section for shifting the programs to a debug mode and restarting the programs from a check point which has been taken immediately before occurrence of the error, when the detection section has detected the error, and section for executing the programs in the debug mode such that a history of the execution of the restarted programs is reproduced. The programs are again restarted from the check point when a next check point has been reached without reproduction of the error.

5 Claims, 3 Drawing Sheets

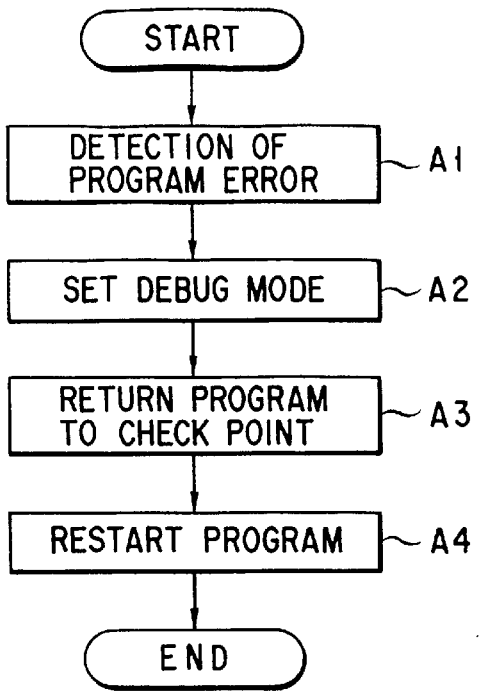
FIG. 3
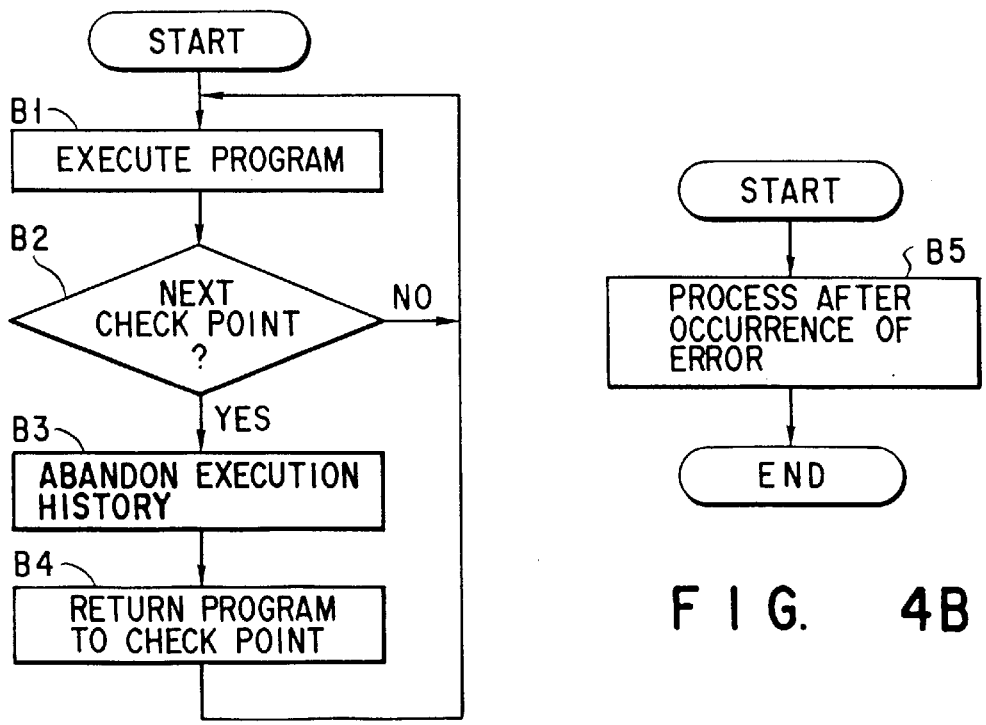
FIG. 4A
FIG. 4B

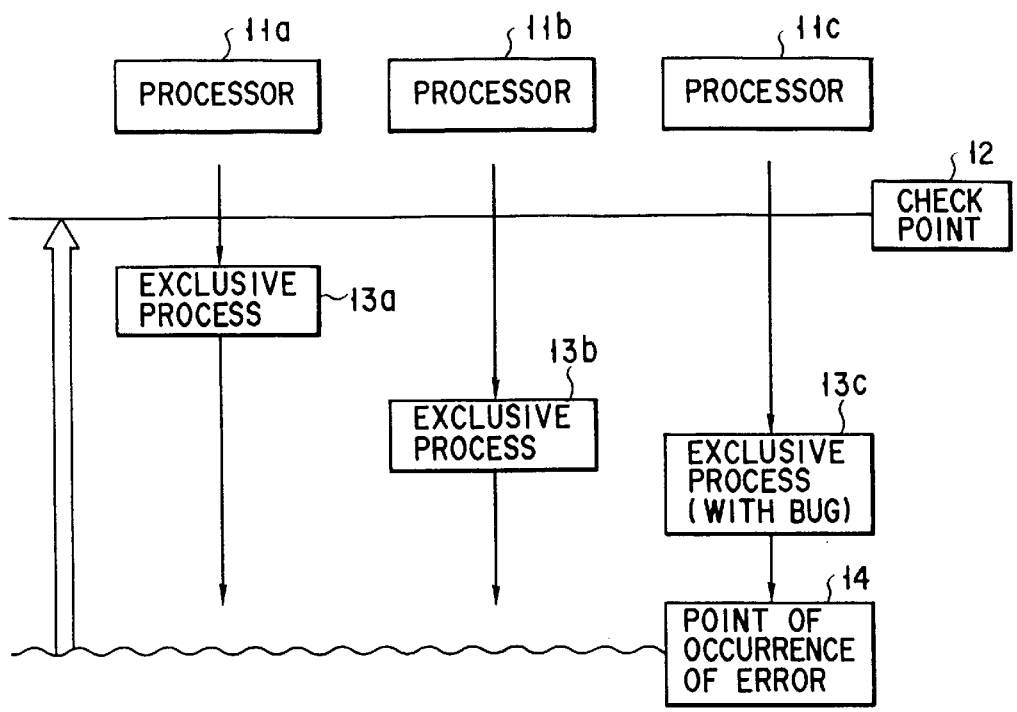
F I G. 5
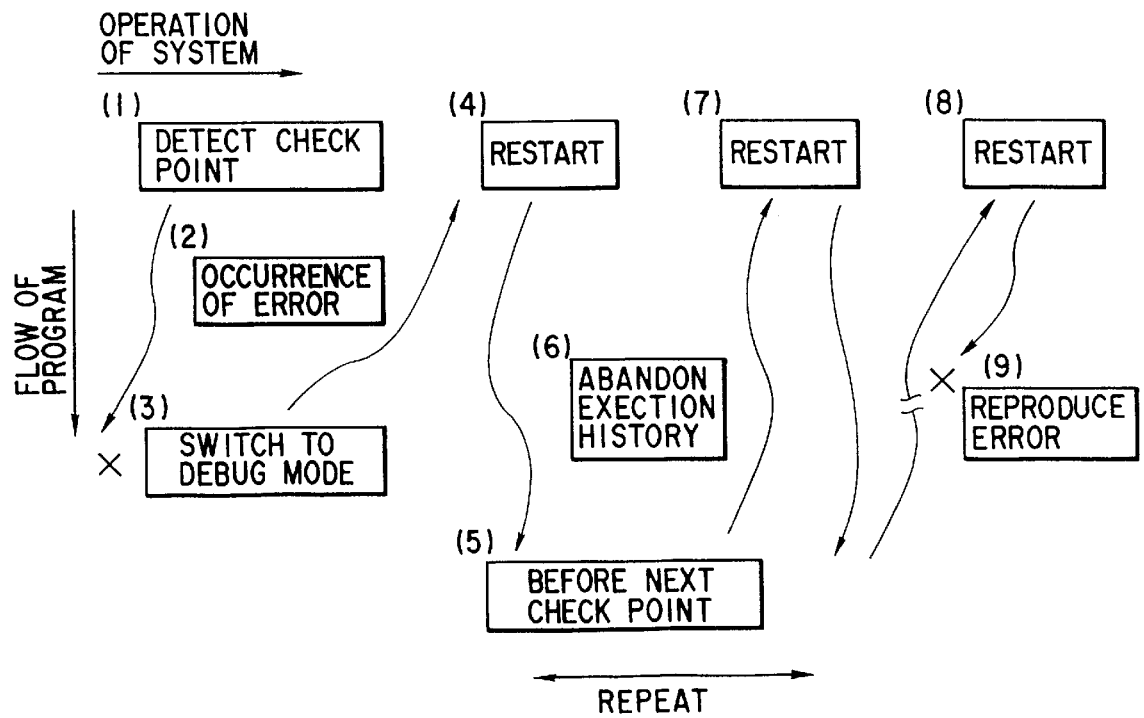
F I G. 6

DEBUG SYSTEM AND METHOD FOR REPRODUCING AN ERROR OCCURRING IN PARALLEL-EXECUTED PROGRAMS

This is a continuation of application Ser. No. 08/443,463, filed May 18, 1995, now abandoned, which is incorporated herein by reference.

BACKGROUND OF THE INVENTION

1. Field of the Invention

This invention relates to a debug method and a debug system for reproducing an error which has occurred in programs executed in a parallel manner in a multiprocessor system because of a timing error between the programs.

2. Description of the Related Art

Various debug methods for programs have recently been developed, which means that general debug methods have been established. For example, the debug methods include breakpoint setting, single-step execution, symbolic debug, etc. The breakpoint setting is a technique for setting a point of time at which control is shifted to a debugger in a case where it advances to a designated subroutine, etc. The single-step execution is a technique for executing programs in units of a single command. The symbolic debug is a technique for performing debug in accordance with a source program, in which technique the process of debug is designated by a subroutine or a variable.

Those debug methods, however, are employed in single processors, and such debug methods as applicable to multiprocessors are now being developed.

In particular, in the case of programs executed by processors simultaneously in a parallel manner, it is highly possible that when an error has occurred, it cannot be reproduced because of a subtle shift of timing in the execution of the programs. This being so, debug is more and more difficult.

For example, suppose that programs are executed in a parallel manner by processors $11a$–$11c$ incorporated in a multiprocessor system as shown in FIG. 1.

If one (e.g. $13c$) of exclusive processes $13a$–$13c$ included in the programs has a bug, the exclusive process $13c$ is not normally executed, thereby causing an error due to a timing shift between the exclusive processes $13b$ and $13c$. In such a case, it is necessary to reproduce the error by executing a debugger while synchronizing the processors $11a$–$11c$. Thus, the efficiency of debug is inevitably low. Further, in a worst case, it is not possible to reproduce the error and debug the bug.

As explained above, when an error has occurred in programs executed in a parallel manner by processors, because of a timing shift between the processors, it is very difficult for the conventional debug system to debug a bug in the programs, or it is not possible for the same to reproduce and hence debug the bug.

SUMMARY OF THE INVENTION

It is the object of the invention to provide a debug method and a debug system capable of easily reproducing an error when it has occurred in programs executed in a parallel manner in a multiprocessor system, thereby debugging it at high efficiency.

To attain the above object, the debug system for use in a multiprocessor system for executing a plurality of programs while taking check points, comprises: detection means for detecting an error in any of the programs; restart means for shifting the programs to a debug mode and restarting the programs from a check point which has taken immediately before occurrence of the error, when the detection means has detected the error; and means for executing the programs in the debug mode such that a history of the execution of the restarted programs is reproduced; wherein the programs are again restarted from the check point when a next check point has been reached without reproduction of the error.

With the above construction, an error which has produced in any of the programs can be easily reproduced, with the use of minimum error-analysis data, which is difficult for the conventional art to do. Therefore, a recording medium can effectively be used and the efficiency of debug can significantly be increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a flowchart, useful in explaining the operation of the debug system of FIG. 2 from the time of occurrence of an error to the time of restart of the program;

FIGS. 4A and 4B are flowcharts, useful in explaining the operation of the debug system of FIG. 2 after the restart of the program;

FIG. 5 is a view, useful in explaining an error caused by a bug in one of exclusive operations performed in the debug system of FIG. 2; and FIG. 6 is a view, showing the operation of the debug system of FIG. 2 and the flow of a program.

DETAILED DESCRIPTION OF THE PREFERRED EMBODIMENTS

The embodiment of the invention will be explained with reference to the accompanying drawings.

Figure 1:
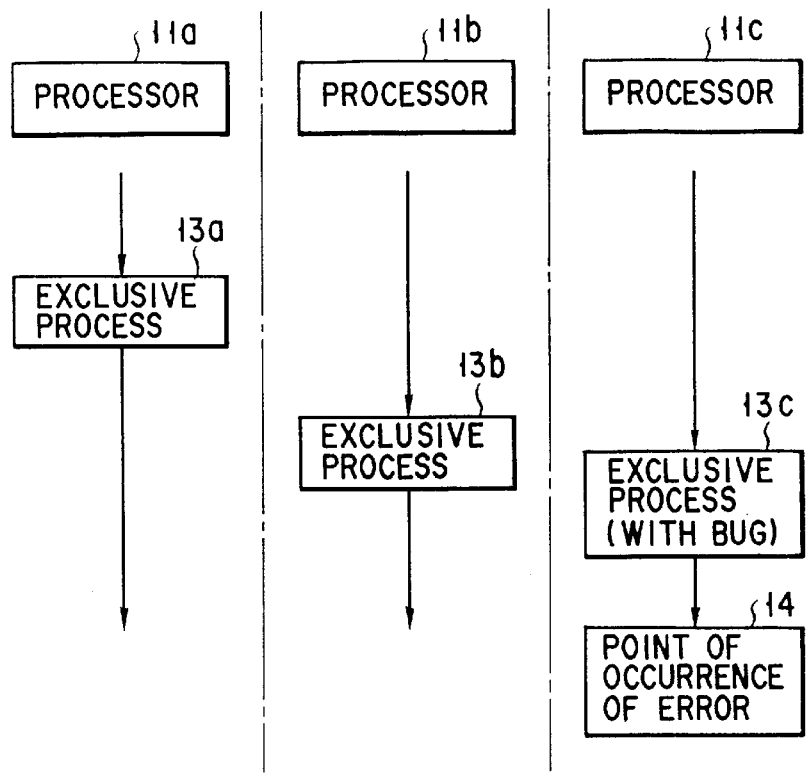
FIG. 1 is a schematic view, useful in explaining the flow of the processes performed by a system to which a conventional debug system is applied.
Figure 2:
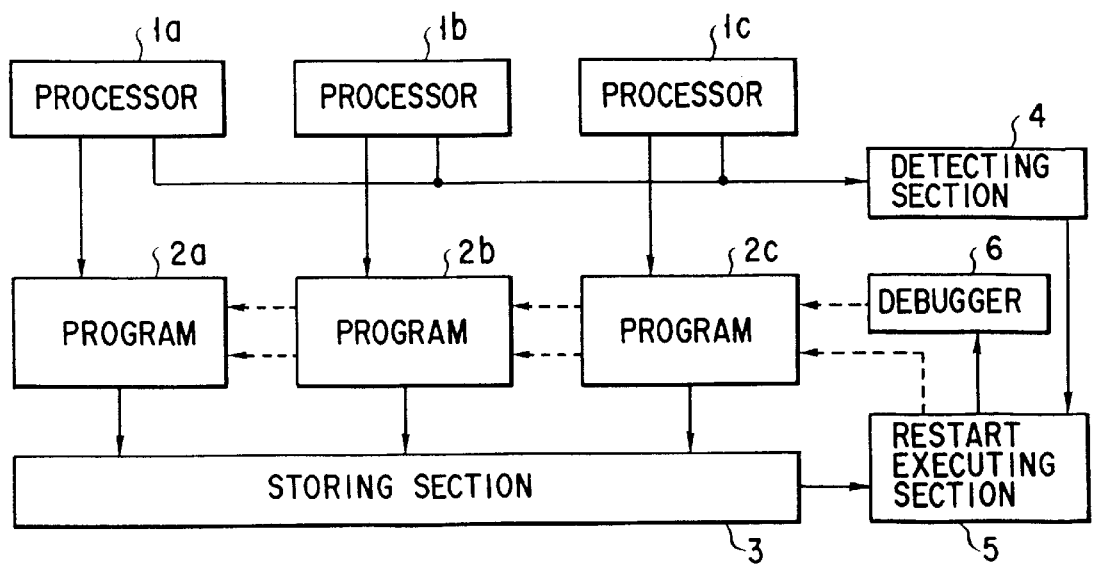
FIG. 2 is a block diagram, showing a debug system according to the embodiment of the invention.

FIG. 2 shows a debug system according to the embodiment of the invention. In FIG. 2, processors $1a$, $1b$ and $1c$ constitute a multi-program processor system for executing programs $2a$, $2b$ and $2c$ in a parallel manner. The processors $1a$, $1b$ and $1c$ execute the programs $2a$, $2b$ and $2c$, respectively.

While processing the programs $2a$, $2b$ and $2c$, the processors $1a$, $1b$ and $1c$ take check points in regular intervals of time. Data taken at each check point are sequentially stored in a storing section 3.

Each processor generates a trap signal when an error has occurred in a corresponding program.

A detecting section 4 detects trap signals generated from any of the processors $1a$, $1b$ and $1c$. Upon detection of a trap signal, the detecting section 4 instructs a restart-executing section 5 to perform restart processing.

The restart-executing section 5 performs the restart processing in accordance with the instruction from the detecting section 4. Specifically, when the restart-executing section 5 has been instructed by the detecting section 4 to perform the restart processing, it shifts the programs 2a, 2b and 2c with the bug to a debug mode, and restarts the same, on the basis of data stored in the storing section 3, from a check point which has taken been immediately before occurrence of the bug.

After the restart-executing section 5 shifts the programs 2a, 2b and 2c to the debug mode, the programs 2a, 2b and 2c are executed while a debugger 6 is run. Each program 2a, 2b or 2c is executed, for example, in units of a single step, or units of a single command, or is executed such that the history of program execution is taken.

FIGS. 3 and 4 are flowcharts, useful in explaining the operation of the debug system according to the embodiment.

Referring first to the flowchart of FIG. 3, the operation will be explained which is performed from the time of occurrence of an error to the time of start of the restart processing.

Suppose that an error has occurred in any one of the programs 2a, 2b and 2c executed in a parallel manner, and that a corresponding processor has generated a trap signal indicative of the occurrence of the error.

Then, the detecting section 4 detects the trap signal generated from the processor 1a, 1b or 1c (step A1), recognizing the occurrence of the error therein. At this time, the detecting section 4 instructs the restart-executing section 5 to perform the restart processing.

In accordance with the instruction from the detecting section 4, the restart-executing section 5 shifts the programs 2a, 2b and 2c to the debug mode (step A2). In other words, the restart executing section 5 controls the program 2a, 2b and 2c such that the program is executed while the debugger is run. On the basis of data stored in the storing section 3, the restart-executing section 5 returns a running point of the programs 2a, 2b and 2c to a check point which has been taken immediately before the occurrence of the error (step A3).

Then, the restart-executing section 5 restarts programs 2a, 2b and 2c under the running of the debugger (step A4).

Referring then to the flowcharts of FIGS. 4A and 4B, the operation will be explained which is performed after the programs are restarted under the running of the debugger.

As shown in FIG. 4A, the program 2a, 2b and 2c are again executed such that the history of program execution is reproduced. Specifically, the debugger executes, on the basis of data stored in the storing section 3, the programs 2a, 2b and 2c such that the history of program execution is reproduced (step B1). Until the next check point is reached, i.e., so long as the answer to the question of step B2 is No, the execution of the program is repeated.

If the next check point is reached before the error is reproduced, i.e., if the answer to the question of step B2 is Yes, the reproduced history of program execution is abandoned (step B3), control is returned again to the check point which has been taken immediately before the occurrence of the bug, thereby repeating the restart of the programs (step B4).

As described above, unless the error is reproduced, the restart processing is repeated.

When the program execution under the running of the debugger shown in FIG. 4A has reproduced the error, a process after occurrence of the error is performed (step B5), as shown in FIG. 4B. For example, if an error is reproduced before the next check point is reached after the execution of the program shown in FIG. 4A, the processing in step B5 is performed. In the processing, the debugger generates an interruption signal when the error occurs, thereby saving the record of the program execution history, etc. After the processing in step B5, the control is terminated.

FIGS. 5 and 6 are views, useful in explaining the overall operation of the debug system according to the embodiment.

FIG. 5 indicates a case where a bug is included in one of exclusive processes. As is shown in FIG. 5, programs are executed in a parallel manner under the control of a multiprocessor system with three processors 11a–11c.

In the FIG. 5 case, two of three exclusive processes 13a–13c, for example, the process 13b and the process 13c occupy the same resource in overlapping time because of a bug in the process 13c, and therefore they cannot be executed normally. In this case, all programs executed by the processors 11a–11c are shifted to the control of the debugger.

After all the programs are shifted to the control of the debugger, all the processors are synchronized, and all the programs are restarted from a check point 12 which has been taken immediately before occurrence of the error. Such restart processing is repeated until the error is reproduced.

FIG. 6 is a view, showing the operation of the system and the flow of the programs.

As is shown in FIG. 6, each program is processed by a corresponding processor at regular intervals while check points are taken (step (1)). When a program error due to a bug occurs (step (2)), a processor corresponding to the program on which the error occurred generates a trap signal, and the occurrence of the error is notified to the restart-executing section 5 via the detecting section 4. Then, the restart-executing section 5 shifts the program to the debug mode (step (3)).

Further, the restart-executing section 5 controls the programs so as to restart from the check point which has been taken immediately before the occurrence of the error (step (4)).

As explained above, after shifting to the debug mode, the programs 2a, 2b and 2c restart from a check point which has taken immediately before the occurrence of the error, with reproducing the history of program execution.

If the next check point is reached without reproducing the error (step (5)), the reproduced history of program execution is abandoned (step (6)), the program is again restarted from the check point immediately before the occurrence of the error (steps (7) and (8)).

The above processing is repeated until the error is reproduced. When the error has been reproduced (step C9), saving of the program execution history, etc. is performed, thereby terminating the control.

As described above, when in the embodiment, a timing error has occurred due to a bug in execution of programs where they are executed in a parallel manner in a multiprocessor system, the error is first detected by the detecting section 4.

Upon detection of the error, the restart-executing section 5 shifts, to the debug mode, the programs executed by all processors of the multiprocessor system, thereby restarting the programs from a check point which has been taken immediately before the occurrence of the error. Each of the programs in the debug mode is executed such that the program execution history is reproduced.

If the error is not reproduced because of a timing shift, etc., and the next check point is reached, the program execution history at the next check point is not reproduced, and the reproduced program execution history is abandoned, thereby again restarting the program from the check point which has been taken immediately before the occurrence of the error. Thus, the restart processing is repeated until the error is reproduced. If, on the other hand, the error is reproduced, the processing is terminated at this point.

As explained above, the debug system can easily reproduce a timing error on programs, which is difficult for the conventional art to do, and also can perform a debug operation at high efficiency.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

Although in the embodiment, each processor generates a trap signal, the invention is not limited to this. For example, the invention may be modified such that a code (e.g. a subroutine called "ASSERT" in the C language, or a macro definition) for examining whether the program is correctly executed is included therein, and that, when the program is not correctly executed, it shifts to a debug mode and is restarted from the check point which was last taken, just as if the program itself generates a trap signal.

In summary, the invention can easily reproduce an error which has produced in any of the programs, with the use of minimum error-analysis data, which is difficult for the conventional art to do. Therefore, a recording medium can effectively be used and the efficiency of debug can significantly be increased.

What is claimed is:

1. A debug system for use in a multiprocessor system for executing a plurality of cooperative programs while taking check points, comprising:

detection means for detecting an error in any of the programs; and restart means for, in accordance with said detection means detecting an occurrence of the error, synchronizing and shifting the plurality of programs to a debug mode by returning the programs to a check point which was taken immediately before the occurrence of the error, and executing the plurality of programs in units of a single step in the debug mode from the check point to reproduce a history of the execution of the programs in the units of a single step, wherein said restart means repeatedly restarts the programs from the check point to a next check point until the error is reproduced.

2. The system according to claim 1, wherein said restart means includes means for abandoning the reproduced history and again restarting the restarted programs from the check point, when a next check point has been reached without reproduction of the error.

3. The system according to claim 2, wherein said restart means further includes means for storing the history when the error is reproduced.

4. A debug system for use in a multiprocessor system for executing a plurality of cooperative programs while taking check points, comprising:

detection means for detecting an error in any of the programs; and restart means for, in accordance with said detection means detecting an occurrence of the error synchronizing and shifting the plurality of programs to a debug mode by executing the plurality of programs in units of a single step in the debug mode from a check point which was taken immediately before the occurrence of the error to reproduce a history of the execution of the programs in the units of a single step, the programs being restarted again from the check point when a next check point has been reached without reproduction of the error.

5. A debug method for reproducing an error in a multiprocessor system for executing a plurality of cooperative programs while taking check points, comprising the steps of:

synchronizing and shifting the plurality of programs to a debug mode by returning the programs to a check point which was taken immediately before occurrence of the error;

restarting the plurality of programs in units of a single command in the debug mode from the check point to reproduce a history of the execution of the programs in the units of a single command; and abandoning the reproduced history when a next check point has been reached without reproduction of the error, and again restarting the restarted programs from the check point, wherein the programs are repeatedly restarted from the check point to a next check point until the error is reproduced.

* * * * *

UNITED STATES PATENT AND TRADEMARK OFFICE
CERTIFICATE OF CORRECTION

PATENT NO. : 6,031,991
DATED : February 29, 2000
INVENTOR(S) : Hideaki Hirayama

Page 1 of 1

It is certified that error appears in the above-identified patent and that said Letters Patent is hereby corrected as shown below:

Title page,
Item [75], inventor, line 1, "Kawasaki-shi" should read -- Kawaski --.
Item [73], Assignee, line 1, "kabsuhiki" should read -- Kabushiki --.

Claim 4,
Column 6,
Line 20, after "error", insert -- , --.

Signed and Sealed this

Twenty-first Day of August, 2001

Attest:

NICHOLAS P. GODICI
Attesting Officer
Acting Director of the United States Patent and Trademark Office